(12) United States Patent
Chu (10) Patent No.: US 8,917,515 B2
(45) Date of Patent: Dec. 23, 2014

(54) ELECTRONIC DEVICE HAVING WATERPROOF AND SHOCKPROOF FUNCTIONS

(71) Applicant: Wistron Corporation, New Taipei (TW)

(72) Inventor: Ming-Yang Chu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 153 days.

(21) Appl. No.: 13/752,401

(22) Filed: Jan. 29, 2013

(65) Prior Publication Data

US 2014/0162483 A1    Jun. 12, 2014

(30) Foreign Application Priority Data

Dec. 7, 2012    (TW) .............................. 101146227 A (51) Int. Cl.
*H05K 7/00*    (2006.01)
*H01R 13/52*    (2006.01)
*H04M 1/00*    (2006.01)

(52) U.S. Cl.
CPC ............. *H01R 13/5202* (2013.01); *H04M 1/00* (2013.01)
USPC ............................ 361/728; 361/796; 361/752

(58) Field of Classification Search
USPC .................... 361/679.01, 728–730, 752, 796; 174/35 R, 51; 439/76.1, 55
See application file for complete search history.

(56) References Cited

U.S. PATENT DOCUMENTS

| 5,736,675 A * | 4/1998 | Michaels ...................... 174/50.5 |
| 6,709,253 B2 * | 3/2004 | Hattori et al. ................. 425/116 |
| 6,877,994 B2 | 4/2005 | Huang |
| 7,071,416 B2 * | 7/2006 | Ricco et al. ................... 174/100 |
| 8,247,708 B1 * | 8/2012 | Ayres et al. .................... 174/564 |
| 8,357,015 B2 * | 1/2013 | Kohmura et al. ............. 439/736 |
| 8,716,607 B2 * | 5/2014 | Chang ........................... 174/657 |
| 2006/0082157 A1 * | 4/2006 | Czuhanich et al. ........... 285/420 |

FOREIGN PATENT DOCUMENTS

EP    1684298    7/2006

* cited by examiner

*Primary Examiner* — Hung S Bui
(74) *Attorney, Agent, or Firm* — Winston Hsu; Scott Margo (57) ABSTRACT

An electronic device includes a casing, a circuit board, a connector and a waterproof component. The casing includes an opening structure. The circuit board is disposed inside the casing. The connector includes a first joint, a second joint and a soft cable. The first joint pierces through the opening structure. The second joint is disposed on the circuit board. The soft cable is electrically connected to the first joint and the second joint in a curvedly deformable manner. a length of the soft cable is substantially greater than an amount of vibration amplitude and a distance between the first joint and the second joint. The waterproof component is disposed between the first joint and the opening structure. Vibration from the casing can be transmitted toward the soft cable via the first joint, and is decayed by structural deformation of the soft cable.

20 Claims, 6 Drawing Sheets

ELECTRONIC DEVICE HAVING WATERPROOF AND SHOCKPROOF FUNCTIONS

BACKGROUND OF THE INVENTION

1. Field of the Invention

The present invention relates to an electronic device with connectors, and more particularly, to an electronic device with specific-form connector for waterproof and shockproof.

2. Description of the Prior Art

A conventional USB connector disposes the joint on the circuit board by soldering, and the conventional USB connector passes through a hole formed on the casing whereinside the circuit board is disposed, so that an external connector can insert into the hole to be electrically connected to the USB connector for signal transmission. The conventional USB connector is fixed on the circuit board, and the conventional USB connector may be damaged and separated from the casing when the casing is hit. Besides, there is no protection for the hole on the casing. Liquid may leak onto the circuit board via the gap between the USB connector and the casing, and the electronic components inside the casing, such as the circuit board and other conductive components, are damaged by short. A conventional waterproof method utilizes an airtight gasket to obstruct the hole. However, the casing with the detachable airtight gasket is inartistic. The external connector can insert into the hole for connection after the airtight gasket is removed from the casing, so that operation of the conventional waterproof method is inconvenient. Therefore, design of an electronic device with artistic appearance and waterproof/shockproof functions is an important issue in the mechanical industry.

SUMMARY OF THE INVENTION

The present invention provides an electronic device with specific-form connector for waterproof and shockproof for solving above drawbacks.

According to the claimed invention, an electronic device having waterproof and shockproof functions is disclosed. The electronic device includes a casing, a circuit board, a connector and a waterproof component. An opening structure is disposed on the casing. The circuit board is disposed inside the casing. The connector is disposed between the casing and the circuit board. The connector includes a first joint, a second joint and a soft cable. The first joint pierces through the opening structure. The second joint is disposed on the circuit board. Two ends of the soft cable are electrically connected to the first joint and the second joint respectively. A length of the soft cable is substantially greater than an amount of vibration amplitude of the first joint and a distance between the first joint and the second joint. The waterproof component is disposed between the casing and the connector for filling a gap between the first joint and the opening structure. Vibration is transmitted from the casing to the soft cable via the waterproof component and the first joint, and the vibration is decayed due to structural deformation of the soft cable.

According to the claimed invention, the waterproof component is detachably disposed on the first joint, or is integrated with the opening structure of the casing monolithically.

According to the claimed invention, the soft cable is a resilient component. A resilient deformation of the resilient component is substantially greater than the vibration amplitude of the first joint or the second joint.

According to the claimed invention, the soft cable is a twisting component. A twisting deformation of the twisting component is substantially greater than the vibration amplitude of the first joint or the second joint.

According to the claimed invention, the waterproof component is made of resilient material. The waterproof component is disposed between the first joint and the opening structure in a compressively deformable manner.

According to the claimed invention, a thickness of the waterproof component is substantially greater than dimensions of the gap between the first joint and the opening structure.

According to the claimed invention, a hole is formed on the waterproof component, and the first joint inserts into the hole to combine with the waterproof component. A diameter of the hole is substantially smaller than dimensions of the first joint.

According to the claimed invention, the waterproof component includes an annular portion and a contacting portion. The annular portion is disposed between an inner wall of the opening structure and the first joint. The contacting portion is connected to an edge of the annular portion, and the contacting portion contacts against a lateral wall of the opening structure adjacent to the inner wall.

According to the claimed invention, an outside diameter of the contacting portion is substantially greater than an aperture of the opening structure.

According to the claimed invention, the annular portion is resiliently deformed at a first direction, and the contacting portion is resiliently deformed at a second direction perpendicular to the first direction.

According to the claimed invention, the electronic device further includes a fixing component disposed on the first joint and fixed on the casing.

According to the claimed invention, the fixing component is fixed on the casing in a screw lock manner or in a heat melt manner.

According to the claimed invention, the waterproof component is buckled by the fixing component and the casing, and the waterproof component is resiliently deformed due to pressure.

According to the claimed invention, the fixing component includes a base and a roof. The base is disposed on a lateral wall of the casing adjacent to the opening structure, and the roof is disposed on the other lateral wall of the casing adjacent to the opening structure and relative to the base. The first joint is buckled by the roof and the base.

According to the claimed invention, the base includes an accommodating slot structure whereinside the first joint is disposed.

According to the claimed invention, the base and the roof are separated units.

According to the claimed invention, the fixing component includes a covering portion and a constraining portion. The covering portion is disposed on a surface of the first joint. The constraining portion is connected to the covering portion, and the constraining portion contacts against a side of the first joint connected to the soft cable.

According to the claimed invention, the fixing component further includes a supporting portion connected to the covering portion and disposed on a boss of the casing.

The present invention utilizes the soft cable to electrically connect to the joints for preventing transmission of the vibration from the casing to the circuit board, so that the joint disposed on the circuit board can keep steady to increase stability of the electronic device. The present invention further utilizes the waterproof component to absorb the vibration with the soft cable, and the waterproof component can prevent leakage of the casing. Thus, the electronic device of the present invention can have functions of waterproof and shockproof and provide preferable operational convenience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
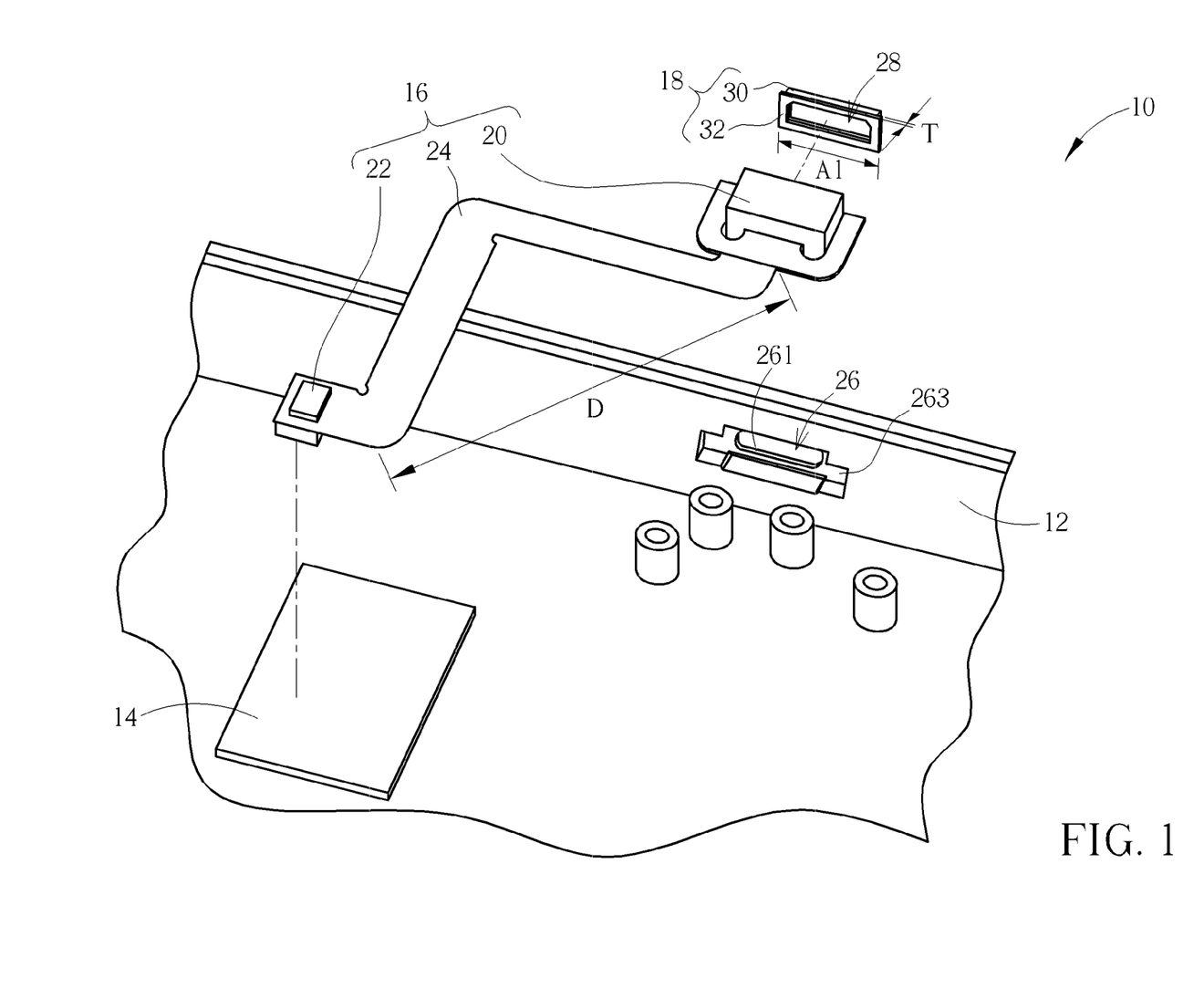
FIG. 1 is an exploded diagram of an electronic device according to an embodiment of the present invention.

Please refer to FIG. 1. FIG. 1 is an exploded diagram of an electronic device 10 according to an embodiment of the present invention. The electronic device 10 can be a portable apparatus, such as the handheld phone, the tablet computer and the personal digital assistant. The electronic device 10 has at least one port to detachably connect to an external connector. The port can be the USB interface or the audio interface. The electronic device 10 of the present invention has waterproof and shockproof functions. The present invention can prevent the electronic device 10 from damage due to liquid leakage of the port, and further can prevent inner electronic components of the electronic device 10 from damage due to vibration.

As shown in FIG. 1, the electronic device 10 includes a casing 12, a circuit board 14, a connector 16 and a waterproof component 18. The circuit board 14 is disposed inside the casing 12. The connector 16 can be a waterproof connector, which includes several units respectively disposed on the casing 12 and the circuit board 14. The connector 16 includes a first joint 20, a second joint 22 and a soft cable 24. The first joint 20 pierces through an opening structure 26 disposed on the casing 12 to be connected by an external unit. The second joint 22 is fixed on the circuit board 14 by soldering. The soft cable 24 can be bent arbitrarily. Two ends of the soft cable 24 are electrically connected to the first joint 20 and the second joint 22 respectively, and the external unit can transmit an electronic signal to the circuit board 14 via the connector 16.

When the electronic device 10 is hit, vibration can be transmitted from the casing 12 to the soft cable 24 via the first joint 20. Because a length of the soft cable 24 (the L-shaped structure shown in FIG. 1) can be substantially greater than an amount of vibration amplitude of the first joint 20 (a movement of the first joint 20 by the hit, not shown in the figure) and a distance D between the first joint 20 and the second joint 22, the soft cable 24 can wave inside a vacant space between the casing 12 and the circuit board 14, so as to dissipate vibration transmitted from the first joint 20 by structural deformation for preventing the vibration from transmitting toward the second joint 22, so that connection between the second joint 22 and the circuit board 14 can be steady without fracture.

The soft cable 24 can be a resilient component, such as the stretchable spring. Maximum resilient deformation of the resilient component can be substantially greater than the vibration amplitude of the first joint 20, the vibration amplitude of the second joint 22, or an amount of the vibration amplitude of the first joint 20 and the second joint 22. The soft cable 24 further can be a twisting component, such as the flexible printed circuit board. Maximum twisting deformation of the twisting component can be substantially greater than the vibration amplitude of the first joint 20, the vibration amplitude of the second joint 22, or an amount of the vibration amplitude of the first joint 20 and the second joint 22. Therefore, vibration of the first joint 20 transmitted from the casing 12 can not transmit toward the second joint 22 via the soft cable 24.

In addition, the waterproof component 18 is disposed between the casing 12 and the connector 16. The waterproof component 18 can be made of waterproof resilient material. The waterproof component 18 can fill a gap between the first joint 20 and the opening structure 26. For leakage prevention, a thickness T of the waterproof component 18 can be substantially greater than dimensions of the gap formed between the first joint 20 and the opening structure 26, so that the waterproof component 18 can be disposed between the first joint 20 and the opening structure 26 in a compressively deformable manner. It is to say, the waterproof component 18 can be an annular-shaped structure whereon a hole 28 is formed. The first joint 20 inserts into the hole 28 to dispose inside the opening structure 26 of the casing 12. A diameter A1 of the hole 28 can be substantially smaller than dimensions of the first joint 20, and the first joint 20, the waterproof component 18 and the casing 12 can be tightly assembled with each other. The waterproof component 18 not only can be detachably disposed on the first joint 20, but also can be integrated with the opening structure 26 of the casing 12 monolithically by the double injection molding method. Applications of the waterproof component 18 are not limited to the above-mentioned embodiments, and depend on actual demand.

Figure 2:
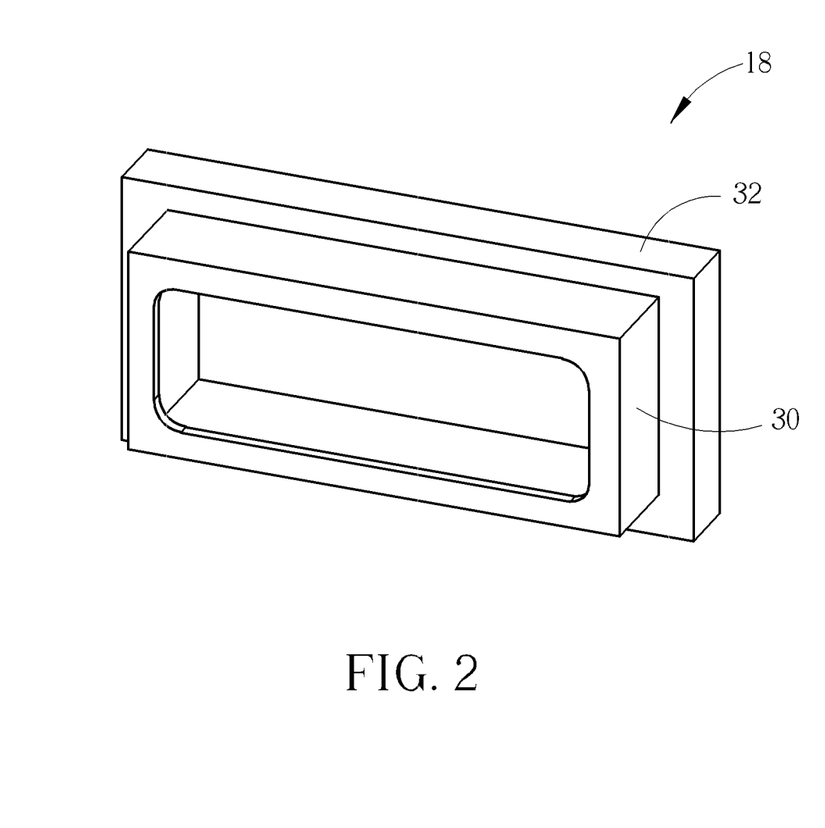
FIG. 2 is a diagram of a waterproof component according to the embodiment of the present invention.
Figure 3:
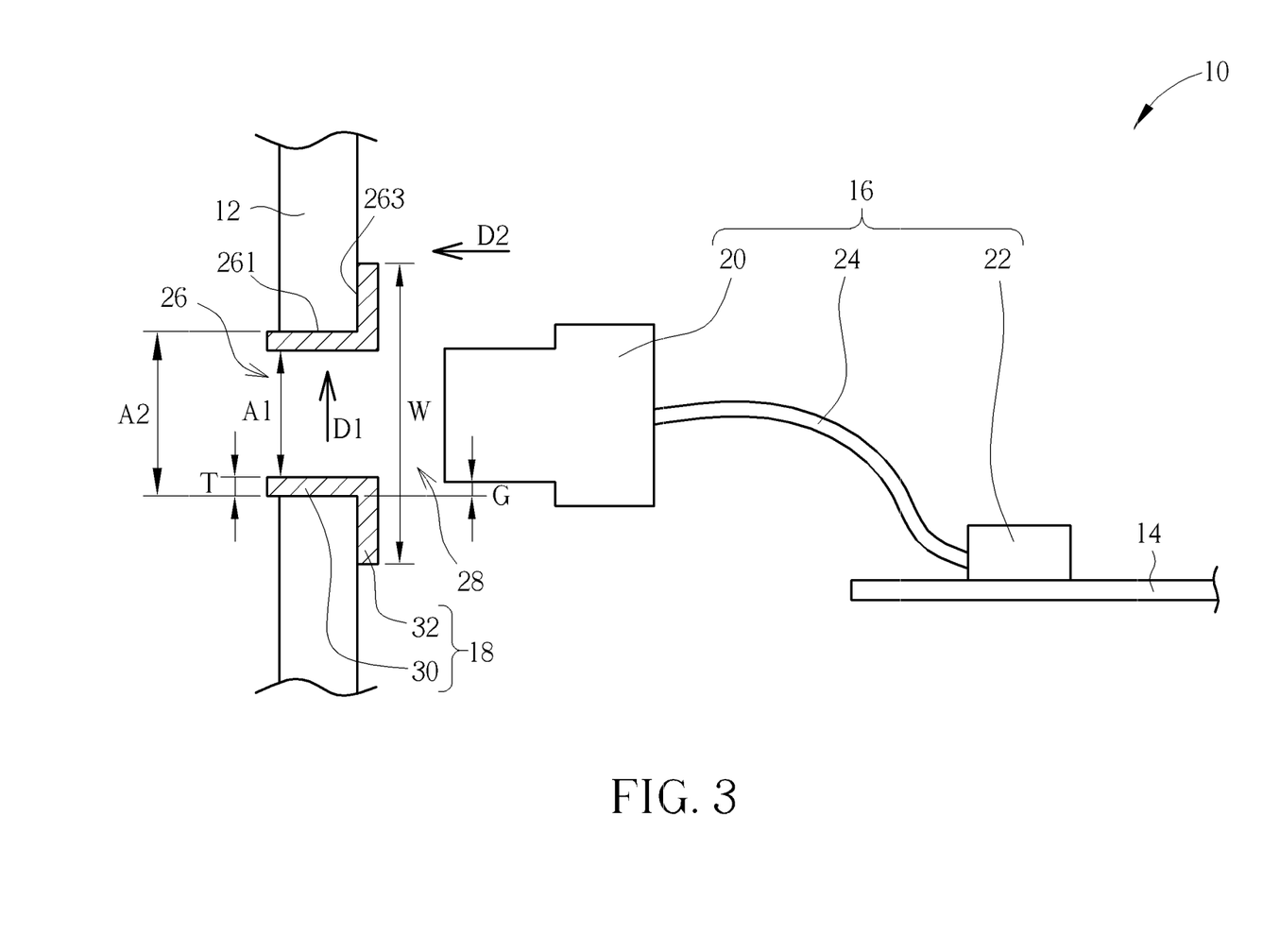
FIG. 3 is a sectional view of the electronic device before assembly according to the embodiment of the present invention.

Please refer to FIG. 1 to FIG. 3. FIG. 2 is a diagram of the waterproof component 18 according to the embodiment of the present invention. FIG. 3 is a sectional view of the electronic device 10 before assembly according to the embodiment of the present invention. The waterproof component 18 includes an annular portion 30 and a contacting portion 32. The annular portion 30 is disposed between the first joint 20 and an inner wall 261 of the opening structure 26 when the waterproof component 18 is assembled with the first joint 20. The contacting portion 32 can contact a lateral wall 263 of the opening structure 26 adjacent to the inner wall 261. The inner wall 261 and the lateral wall 263, which are respectively in touch with the annular portion 30 and the contacting portion 32, are the adjacent walls that are perpendicular to each other. The thickness T of the waterproof component 18 is substantially greater than the gap G between the first joint 20 and the opening structure 26, so the duel directional compression of the waterproof component 18 is generated when the first joint 20 is crowded into the opening structure 26.

As shown in FIG. 3, the annular portion 30 can be buckled and compressively deformed at the first direction D1 by the first joint 20 and the inner wall 261 of the opening structure 26. The contacting portion 32 can be buckled and compressively deformed at the second direction D2 by the first joint 20 and the lateral wall 263 of the opening structure 26. Further, an outside diameter W of the contacting portion 32 can be substantially greater than an aperture A2 of the opening structure 26, and the first direction D1 can be substantially perpendicular to the second direction D2. The annular portion 30 and the contacting portion 32 are encircled by the opening structure 26, and the waterproof component 18 can effectively prevent the leakage between the casing 12 and the first joint 20.

Figure 4:
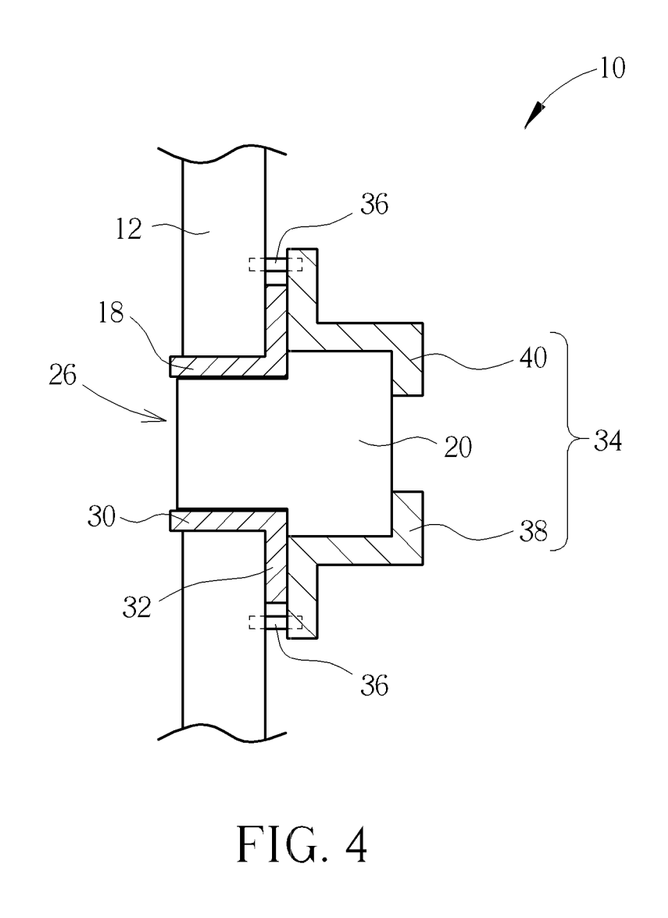
FIG. 4 is a sectional view of the electronic device after assembly according to the embodiment of the present invention.

Please refer to FIG. 3 and FIG. 4. FIG. 4 is a sectional view of the electronic device 10 after assembly according to the embodiment of the present invention. The electronic device 10 can further include a fixing component 34 disposed on the first joint 20 and fixed on the casing 12. The fixing component 34 can be disposed on the casing 12 in a screw lock manner or in a heat melt manner, which means the fixing component 36 can be the screw, the bolt, the heat stake and so on. Application of the fixing component 36 is not limited to the above-mentioned ones, and detailed description is omitted herein for simplicity. The fixing component 34 can buckle the waterproof component 18 with the casing 12. The contact portion 32 is resiliently deformed at the second direction D2 and the annular portion 30 is compressively deformed at the first direction D1 because the thickness T of the waterproof 18 is greater than the gap G, to ensure that the waterproof component 18 can keep the predetermined compression quantity to attain preferable waterproof function.

Figure 5:
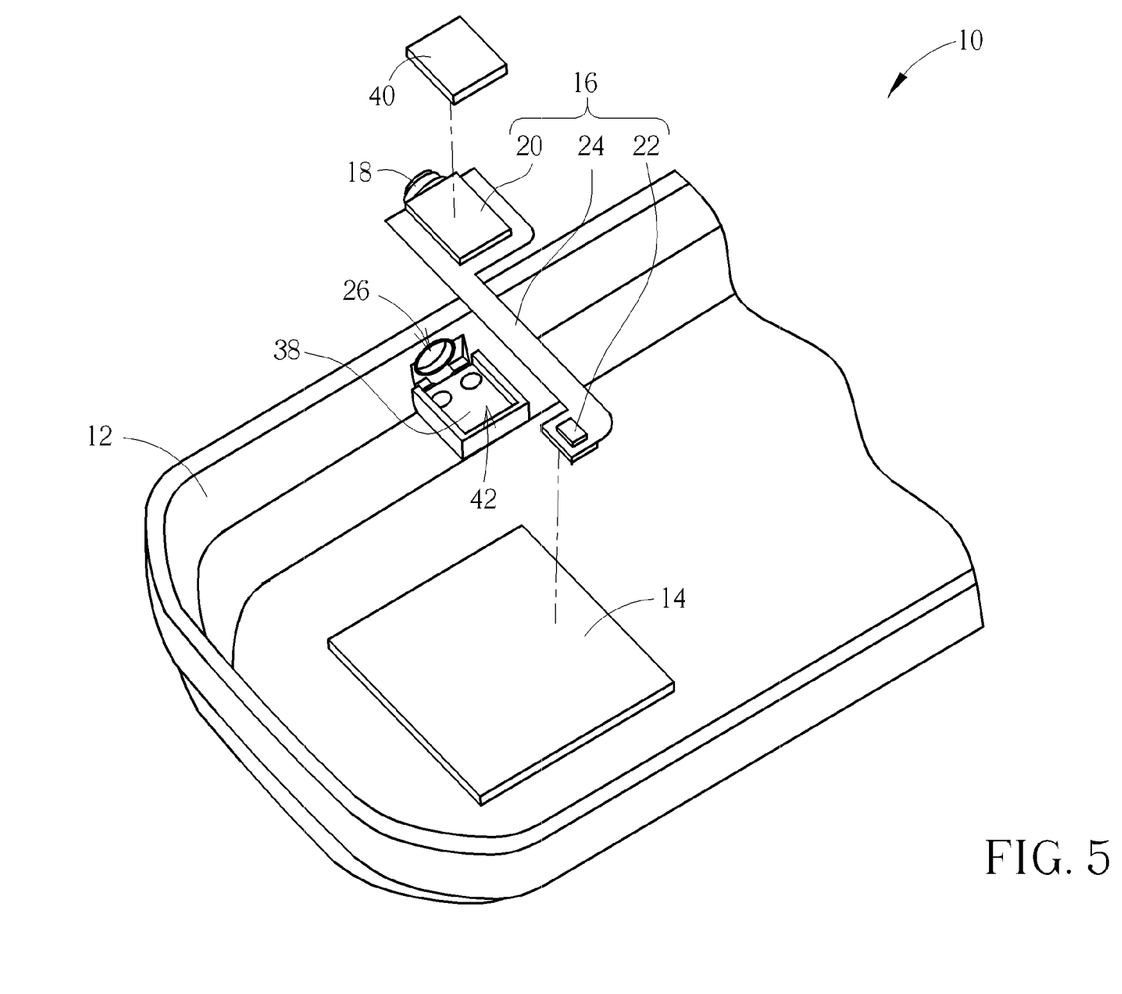
FIG. 5 is a diagram of the electronic device according to the embodiment of the present invention.

Please refer to FIG. 4 and FIG. 5. FIG. 5 is a diagram of the electronic device 10 according to the embodiment of the present invention. The fixing component 34 can include a base 38 and a roof 40. The base 38 is disposed on a low lateral wall of the casing 12 adjacent to the opening structure 26. The base 38 includes an accommodating slot structure 42. The first joint 20 passes through the opening structure 26 to be disposed inside the accommodating slot structure 42. The roof 40 and the base 38 are separated units. The roof 40 is disposed on an upper lateral wall of the casing 12 adjacent to the opening structure 26. The upper lateral wall is opposite to the low lateral wall. The roof 40 covers the first joint 20, which means the first joint 20 can be buckled by the roof 40 and the base 38 to be fixed on the casing 12. Generally, structural design of the fixing component 34 corresponds to shape of the connector 16 and inner space of the casing 12. For example, the connector 16 can be an audio jack in this embodiment.

Figure 6:
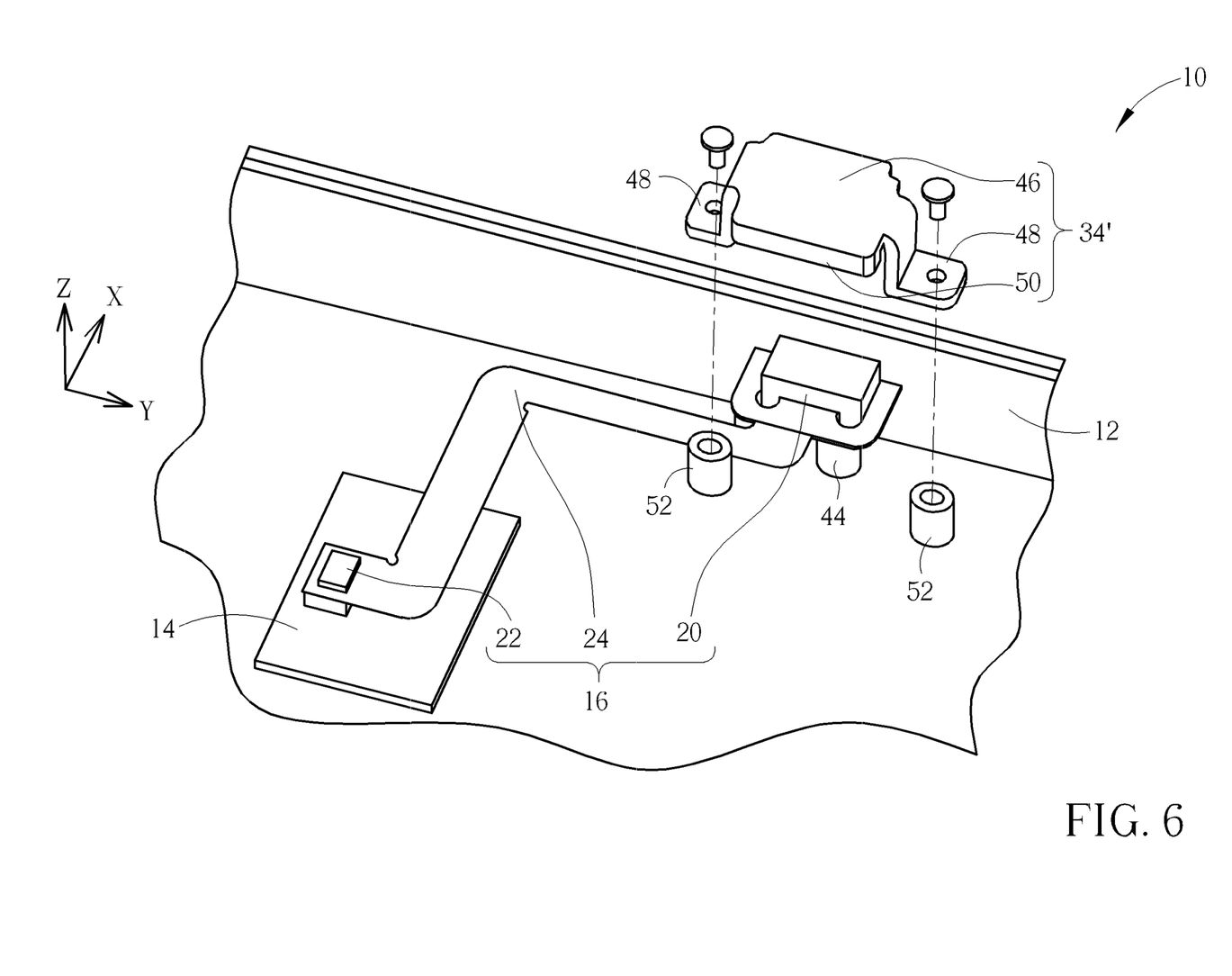
FIG. 6 is a diagram of the electronic device according to the other embodiment of the present invention.

Please refer to FIG. 6. FIG. 6 is a diagram of the electronic device 10 according to the other embodiment of the present invention. In the embodiment, the first joint 20 can be disposed on a supporting component 44 of the casing 12. The supporting component 44 can be a rectangular structure or a circular structure. The fixing component 34' is disposed above the first joint 20. Position of the fixing component 34' corresponds to position of the supporting component 44, so the first joint 20 is buckled by the fixing component 34' and the supporting component 44. The fixing component 34' can include a covering portion 46, two supporting portions 48 and a constraining portion 50. The covering portion 46 can contact against an upper surface of the first joint 20. The supporting portions 48 are respectively connected to two edges of the covering portion 46, which means each supporting portion 48 contacts against the lateral surface of the first joint 20 accordingly and is disposed on a boss 52 of the casing 12. Thus, the U-shaped fixing component 34' can buckle the first joint 20 for constraint.

The constraining portion 50 is connected to an edge of the covering portion 46 different from the supporting portions 48. The constraining portion 50 can contact against a side of the first joint 20 whereon the soft cable 16 is disposed. Thus, the constraining portion 50 and the casing 12 can buckle a front surface and a rear surface of the first join 20 to constrain a movement of the first joint 20 along X direction, the supporting portions 48 can buckle a left surface and a right surface of the first joint 20 to constrain a movement of the first joint 20 along Y direction, the covering portion 46 and the boss 52 can buckle the upper surface and the low surface of the first joint 20 to constrain a movement of the first joint 20 along Z direction, so the first joint 20 is stably disposed on the casing 12. In this embodiment, the connector 16 can be a micro universal serial bus (micro USB) connector. Combination of the fixing component 34' and the casing 12 is not limited to the above-mentioned embodiment (which is assembled by the boss 52 in the screw lock manner), and depend on design demand. For example, the fixing component 34' can be assembled with the casing 12 by the engaging structure or the hook structure.

In conclusion, the electronic device of the present invention utilizes the specific-form connector for the shockproof. The connector of the present invention includes two joints and the soft cable connected between the joints. The joints are respectively disposed on the casing and the circuit board. As the electronic device is hit, the vibration is transmitted from the casing to the soft cable, and the soft cable can decay the vibration via the resilient deformation or the twisting deformation, so as to prevent the vibration from transmitting toward the circuit board and to prevent connection between the circuit board and the joint from fracture. Accordingly, the vibration can decay by the structural deformation when the vibration is transmitted from the circuit board to the soft cable, to effectively prevent separation of the joint and the opening structure of the casing. Besides, the waterproof component which can be compressively deformed at two different directions is disposed between the joint and the opening structure. The waterproof component not only can be a cushion to absorb the vibration, but also can fill the gap between the joint and the opening structure to prevent the leakage. Therefore, the electronic device of the present invention can conform to strict safety regulation of the waterproof and the shockproof without additional airtight gasket.

Comparing to the prior art, the present invention utilizes the soft cable to electrically connect to the joints for preventing transmission of the vibration from the casing to the circuit board, so that the joint disposed on the circuit board can keep steady to increase stability of the electronic device. The present invention further utilizes the waterproof component to absorb the vibration with the soft cable, and the waterproof component can prevent leakage of the casing. Thus, the electronic device of the present invention can have functions of waterproof and shockproof and provide preferable operational convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having waterproof and shockproof functions, the electronic device comprising:
   a casing whereon an opening structure is disposed;
   a circuit board disposed inside the casing;
   a connector disposed between the casing and the circuit board, the connector comprising:
      a first joint piercing through the opening structure;
      a second joint disposed on the circuit board; and
      a soft cable, two ends of the soft cable being electrically connected to the first joint and the second joint respectively, a length of the soft cable being substantially greater than an amount of vibration amplitude of the first joint and a distance between the first joint and the second joint; and a waterproof component disposed between the casing and the connector for filling a gap between the first joint and the opening structure, vibration being transmitted from the casing to the soft cable via the waterproof component and the first joint, and the vibration being decayed due to structural deformation of the soft cable, the waterproof component comprising an annular portion and a contacting portion, the annular portion being disposed between an inner wall of the opening structure and the first joint, the contacting portion being connected to an edge of the annular portion, and the contacting portion contacting against a lateral wall of the opening structure adjacent to the inner wall.

2. The electronic device of claim 1, wherein the waterproof component is detachably disposed on the first joint, or is integrated with the opening structure of the casing monolithically.

3. The electronic device of claim 1, wherein the soft cable is a resilient component, a resilient deformation of the resilient component is substantially greater than the vibration amplitude of the first joint or the second joint.

4. The electronic device of claim 1, wherein the soft cable is a twisting component, a twisting deformation of the twisting component is substantially greater than the vibration amplitude of the first joint or the second joint.

5. The electronic device of claim 1, wherein the waterproof component is made of resilient material, the waterproof component is disposed between the first joint and the opening structure in a compressively deformable manner.

6. The electronic device of claim 1, wherein a thickness of the waterproof component is substantially greater than dimensions of the gap between the first joint and the opening structure.

7. The electronic device of claim 6, wherein a hole is formed on the waterproof component, the first joint inserts into the hole to combine with the waterproof component, and a diameter of the hole is substantially smaller than dimensions of the first joint.

8. The electronic device of claim 1, wherein an outside diameter of the contacting portion is substantially greater than an aperture of the opening structure.

9. The electronic device of claim 1, wherein the annular portion is resiliently deformed at a first direction, the contacting portion is resiliently deformed at a second direction perpendicular to the first direction.

10. The electronic device of claim 1, further comprising:
a fixing component disposed on the first joint and fixed on the casing.

11. The electronic device of claim 10, wherein the fixing component is fixed on the casing in a screw lock manner or in a heat melt manner.

12. The electronic device of claim 10, wherein the waterproof component is buckled by the fixing component and the casing, and the waterproof component is resiliently deformed due to pressure.

13. The electronic device of claim 10, wherein the fixing component comprises a base and a roof, the base is disposed on a lateral wall of the casing adjacent to the opening structure, the roof is disposed on the other lateral wall of the casing adjacent to the opening structure and relative to the base, and the first joint is buckled by the roof and the base.

14. The electronic device of claim 13, wherein the base comprises an accommodating slot structure, the first joint is disposed inside the accommodating slot structure.

15. The electronic device of claim 13, wherein the base and the roof are separated units.

16. The electronic device of claim 10, wherein the fixing component comprises a covering portion and a constraining portion, the covering portion is disposed on a surface of the first joint, the constraining portion is connected to the covering portion, and the constraining portion contacts against a side of the first joint connected to the soft cable.

17. The electronic device of claim 16, wherein the fixing component further comprises a supporting portion connected to the covering portion and disposed on a boss of the casing.

18. An electronic device having waterproof and shockproof functions, the electronic device comprising:
a casing whereon an opening structure is disposed;
a circuit board disposed inside the casing;
a connector disposed between the casing and the circuit board, the connector comprising:
a first joint piercing through the opening structure;
a second joint disposed on the circuit board; and
a soft cable, two ends of the soft cable being electrically connected to the first joint and the second joint respectively, a length of the soft cable being substantially greater than an amount of vibration amplitude of the first joint and a distance between the first joint and the second joint; and
a waterproof component disposed between the casing and the connector for filling a gap between the first joint and the opening structure, vibration being transmitted from the casing to the soft cable via the waterproof component and the first joint, and the vibration being decayed due to structural deformation of the soft cable;
a fixing component disposed on the first joint and fixed on the casing, wherein the fixing component comprises a base and a roof, the base is disposed on a lateral wall of the casing adjacent to the opening structure, the roof is disposed on the other lateral wall of the casing adjacent to the opening structure and relative to the base, and the first joint is buckled by the roof and the base.

19. The electronic device of claim 18, wherein the base comprises an accommodating slot structure, the first joint is disposed inside the accommodating slot structure.

20. The electronic device of claim 18, wherein the base and the roof are separated units.

* * * * *